United States Patent [19]

Kimura

[11] Patent Number: 4,788,618
[45] Date of Patent: Nov. 29, 1988

[54] HIGH VOLTAGE PROTECTING CIRCUIT

[75] Inventor: Kenji Kimura, Nagaokakyo, Japan

[73] Assignee: Mitsubishi Denki Kabushiki Kaisha, Tokyo, Japan

[21] Appl. No.: 71,304

[22] Filed: Jul. 9, 1987

[30] Foreign Application Priority Data

Jul. 9, 1986 [JP] Japan .................. 61-161406

[51] Int. Cl.⁴ .............................. H02H 3/20
[52] U.S. Cl. ...................... 361/86; 361/91;
358/190; 358/243; 315/411
[58] Field of Search .............. 361/18, 36, 35, 58,
361/78, 86, 91, 100-102, 111; 363/50, 51;
358/174, 190, 243, 194.1; 328/8, 9, 10;
315/409-411, 383, 386, 379

[56] References Cited

U.S. PATENT DOCUMENTS

| | | | |
|---|---|---|---|
| 2,815,446 | 12/1957 | Coombs | 328/9 |
| 4,118,739 | 10/1978 | Umehara | 358/190 |
| 4,213,166 | 7/1980 | Watanabe | 361/91 X |

Primary Examiner—A. D. Pellinen
Assistant Examiner—Todd E. DeBoer
Attorney, Agent, or Firm—Birch, Stewart, Kolasch & Birch

[57] ABSTRACT

A high voltage protecting circuit in a cathode ray tube apparatus which comprises a main power switch adapted to be connected in series with an electric power source, a flyback transformer having primary, secondary and third windings, a rectifying circuit connected with the main power switch for rectifying a power source voltage originating from the power source and to be supplied to the flyback transformer, a switching device connected between the main power switch and rectifying circuit and provided with a control terminal, and a high voltage detecting and controlling device for comparing an output voltage, produced across the third winding of the flyback transformer, with a reference voltage and for generating a control signal when the output voltage exceeds the reference voltage. The control signal is utilized to hold the switching device in an OFF position.

8 Claims, 2 Drawing Sheets

HIGH VOLTAGE PROTECTING CIRCUIT

BACKGROUND OF THE INVENTION

1. (Field of the Invention)

The present invention relates to a high voltage protecting circuit for avoiding any possible supply of an excessively high voltage to a cathode ray tube apparatus such as used in a television receiver set, computer display unit, etc.

2. (Description of the Prior Art)

In commercially available television receiver sets, it is well known that, when an excessively high voltage is applied to a cathode ray tube, the emission of X-rays increases to such an extend as to be hazardous to television viewers, and, therefore, a high voltage protecting circuit is generally utilized for avoiding any possible supply of an excessively high voltage to a cathode ray tube. An example of prior art high voltage protecting circuit is disclosed in the Japanese Laid-open Utility Model Publication No. 54-6824 and is illustrated in FIG. 2 of the accompanying drawings.

As shown in FIG. 2, the prior art high voltage protecting circuit comprises a power stabilizing circuit 6 from which an electric power is supplied to various circuits as subsequently described, and a horizontal oscillating circuit 7, a horizontal drive circuit 8 including a horizontal drive transistor 8a and a horizontal drive transformer 8b. The protecting circuit also comprises a horizontal output circuit 9 connected with the horizontal drive circuit 8 and including horizontal output transistor 9a, a damper diode 9b, an resonant capacitor 9c, a deflection coil assembly 9d and an S correcting capacitor 9e, a flyback transformer 10 operable to supply a high voltage to a cathode ray tube 11 and including a primary winding 10a, a secondary windings 10b and a third winding 12, a rectifying diode 13 connected with the third winding 12 of the flyback transformer 10, a smoothing capacitor 14, and a detecting circuit 16 connected with the rectifying diode 13 and including a detector output terminal 16a, a Zener diode 16b for providing a reference voltage and switching transistors 16c and 16d.

The prior art high voltage protecting circuit of the construction shown in and described with reference to FIG. 2 operates in the following manner.

A voltage generated from the third winding 12 of the flyback transformer 10 is rectified by the rectifying diode 13 and the smoothing capacitor 14, and the rectified voltage emerging from a rectifying circuit including the rectifying diode 13 and the smoothing capacitor 14 is then compared with the reference voltage generated across the Zener diode 16b in the detecting circuit 16. During a normal operation of the circuit, the rectified voltage is lower than the reference voltage, and therefore, no detector output is generated at the output terminal 16a of the detecting circuit 16. In this condition, the horizontal drive transistor 8a is operating normally.

However, in the event that the voltage generated from the flyback transformer 10 which is being supplied to the cathode ray tube 11 increases abruptly by some reason, the voltage generated from the third winding 12 of the flyback transformer 10 is correspondingly increased, accompanied by the increase of the rectified output voltage emerging from the rectifying circuit. Since this rectified voltage would be of a value higher than the reference voltage across the Zener diode 16b of the detecting circuit 16, the switching transistor 16c is rendered non-conducting and the switching transistor 16d is held in a conducting state. In this condition, the potential at the output terminal 16a of the detecting circuit 16 increases to hold the horizontal drive circuit 8 in an ON state, causing the horizontal output circuit 9 to cease its operation thereby to interrupt the supply of the high voltage to the cathode ray tube 11. In this way, the circuit acts in a protective mode.

Since according to the prior art high voltage protecting circuit the power source voltage is supplied at all time even during the protective mode of opertion, a non-loaded condition occurs when the horizontal output circuit 9 is brought to a halt. While the television receiver set is generally provided with the power stabilizing circuit, an output voltage from the power stabilizing circuit increases during the non-loaded condition to a value, for example, twice that during the normal operation particularly where the power stabilizing circuit is provided with a switching regulator as is well known to those skilled in the art.

In view of the foregoing, the prior art high voltage protecting circuit requires the use of various circuit component parts each having a high voltage breakdown characteristic, that is, resistant to a high voltage, or they have to be protected with the use of, for example, avalanche diodes. Whetherever the circuit component parts having the high voltage breakdown characteristic are used or whetherever the avalanche diodes are used, it tends to constitute a cause of the increased manufacturing cost. Moreover, the fact that the power source voltage is applied even though the television receiver set is turned off results in waste of energy.

SUMMARY OF THE INVENTION

Therefore, the present invention has been devised with a view to substantially eliminating the above discussed problems or limitations inherent in the prior art high voltage protecting circuit and has for its essential object to provide an improved high voltage protecting circuit effective to bring the television receiver set in an inoperative position in the event of the occurrence of an abnormal increase of the high voltage being produced by the flyback transformer, which circuit can be fabricated with no need to use expensive circuit component parts having a high voltage breakdown characteristic.

An important object of the present invention, therefore is to provide an improved high voltage protecting circuit of the type referred to above, which can be manufactured at a reduced cost and, yet, is reliable in operation.

The above described objects of the present invention can be accomplished by providing a high voltage protecting circuit which comprises a main power switch adapted to be connected in series with an electric power source, for example, a commercial electric power outlet, a flyback transformer having primary, secondary and third windings, a rectifying circuit connected with the main power switch for rectifying a power source voltage originating from the commercial electrical power outlet and to be supplied to the flyback transformer, a switching means connected between the main power switch and the rectifying circuit and provided with a control terminal, and a high voltage detecting and controlling means for comparing an output voltage, produced across the third winding of the flyback transformer, with a reference voltage and for generating a control signal when the output voltage exceeds the reference voltage, said control signal being utilized to hold the switching means in an OFF position.

According to the present invention, in the event of the abnormal increase of the high voltage being supplied to the cathode ray tube, the switching means for controlling the electric power from the electric power source to the flyback transformer is switched off in response to an output signal from the detecting means indicative of the abnormal increase of such high voltage. Therefore, even when the high voltage protecting circuit is operated as a result of the increase of the high voltage to an excessive value, no voltage is applied to the horizontal output circuit.

BRIEF DESCRIPTION OF THE DRAWINGS

In any event, the present invention will become more clearly understood from the following description of a preferred embodiment thereof, when taken in conjunction with the accompanying drawings. However, the embodiment and the drawings are given only for the purpose of illustration and explanation, and are not to be taken as limiting the scope of the present invention in any way whatsoever, which scope is to be determined solely by the appended claims. In the drawings, like reference numerals denote like parts in the several views, and:

DETAILED DESCRIPTION OF THE EMBODIMENT

Figure 1:
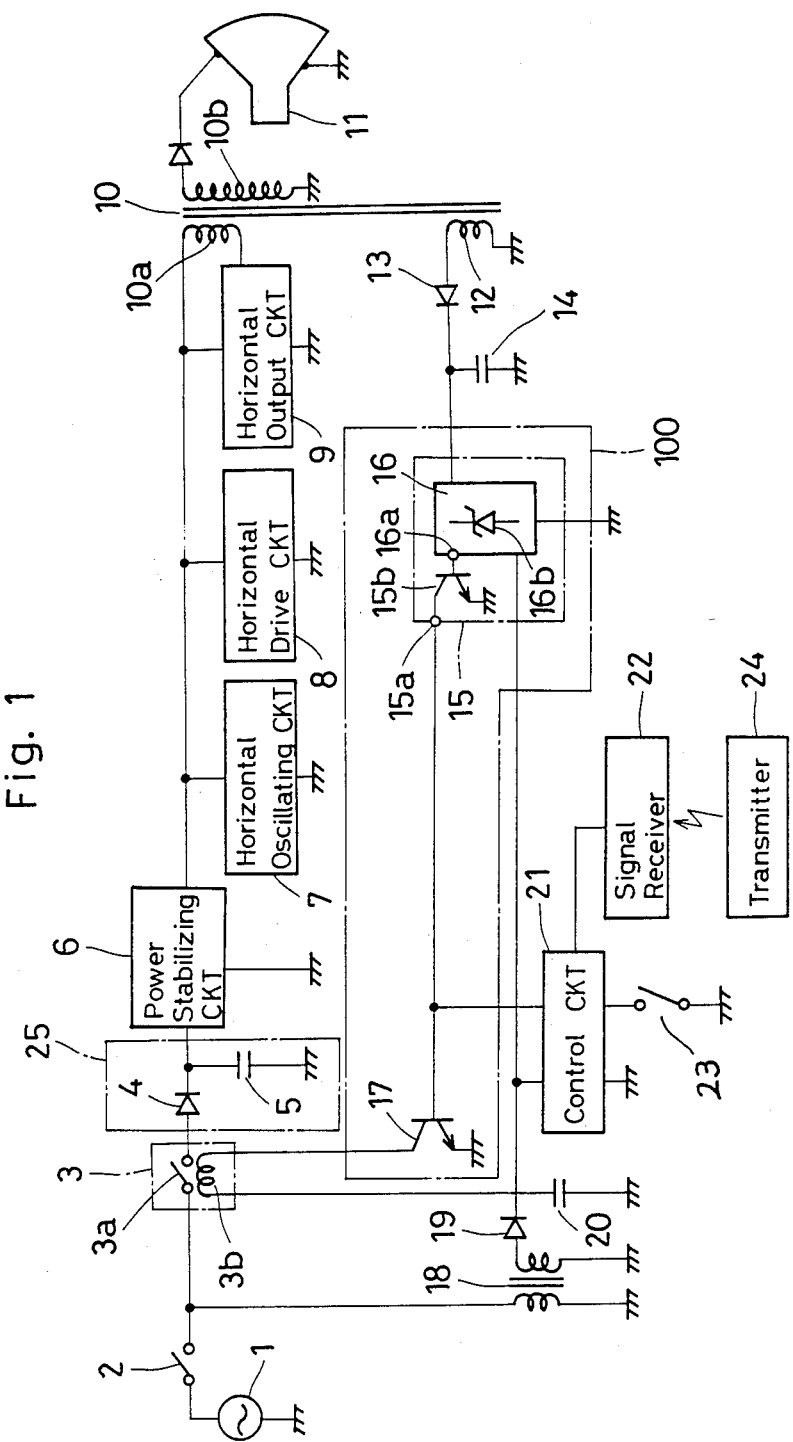
FIG. 1 is a circuit diagram showing a high voltage protecting circuit according to the present invention.
Figure 2:
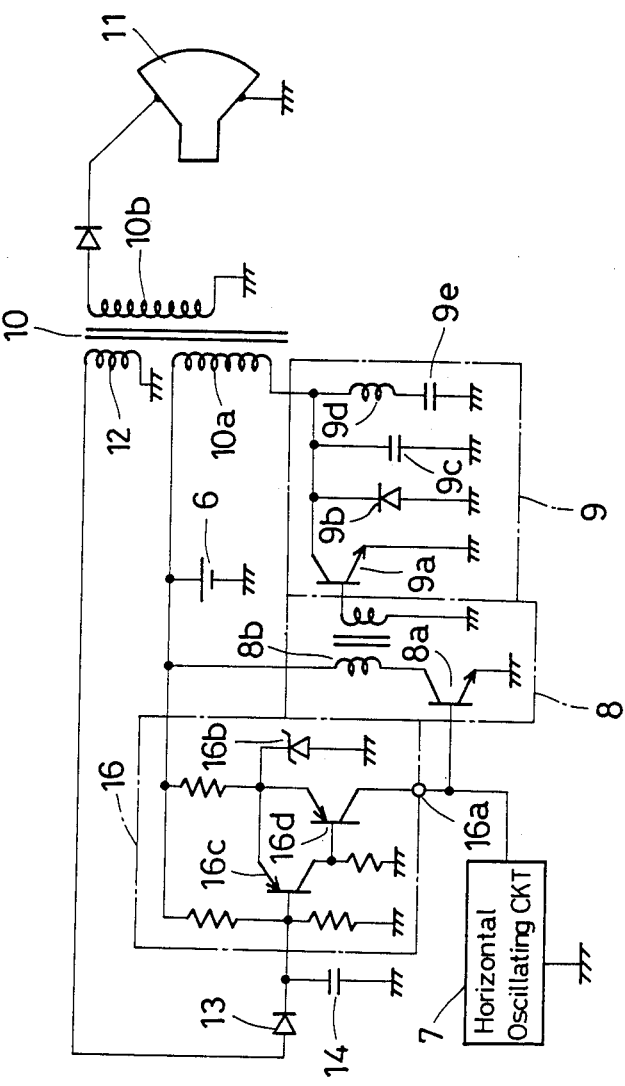
FIG. 2 is a diagram similar to FIG. 1, showing the prior art high voltage protecting circuit.

Referring now to FIG. 1, a high voltage protecting circuit embodying the present invention comprises a main power switch 2 adapted to be connected with a commercial electric power outlet 1, which switch 2 constitutes a standby switch. This main power switch 2, when closed, makes not only the illustrated high voltage protecting circuit, but also other circuits forming a television receiver set ready to be powered on when the TV receiver set receives a signal indicating power-on from a remote controller in a manner as will be described later. A control terminal-equipped switch 3, which is constituted by, for example, a self-energizing relay switch assembly comprised of a relay switch 3a and a relay coil 3b, is connected between the main power switch 2 and a rectifying circuit 25, which rectifying circuit 25 is constituted by including a rectifying diode 4 and a smoothing capacitor 5. As will be described, the relay switch 3a of the relay switch assembly 3 is adapted to be closed in response to a ON signal emitted from a transmitter built in a hand-held remote control unit 24 and received by a receiver 22. Accordingly, it will readily be seen that, when and after both of the main power switch 2 and the relay switch of the relay switch assembly 3 are closed, the color television receiver set is brought in operation and the illustrated high voltage protecting circuit is powered on.

The relay switch 3a of the relay switch assembly 3 is connected through the rectifying diode 4 with the power stabilizing circuit 6 which may be of a type employing either a series regulator or a switching regulator. Reference numerals 7, 8 and 9 represent a horizontal oscillating circuit, a horizontal drive circuit and a horizontal output circuit, respectively.

A flyback transformer generally identified by 10 has a primary winding 10a connected with the horizontal output circuit 9, a secondary winding 10b from which a high voltage is generated for application to a cathode ray tube 11 of the color television receiver set, and a third winding 12 connected with a rectifying circuit comprised of a diode 13 and a capacitor 14. The third winding 12 of the flyback transformer 10 produces a pulse voltage which is rectified by the rectifying circuit, comprised of the diode 13 and the capacitor 14, to provide a high voltage detection signal.

Reference numeral 15 represents a high voltage detecting circuit including an output terminal 15a, an output transistor 15b and a high voltage detector 16, said high voltage detector 16 including a Zener diode 16b having a breakdown voltage corresponding to a reference voltage and an detector output terminal 16a connected with the base of the output transistor 15b. The output terminal 15a of the high voltage detecting circuit 15, which is connected with the collector of the output transistor 15b is in turn connected with the base of a relay drive transistor 17 having its collector connected with the relay coil 3b for driving the latter. It is to be noted that the relay drive transistor 17 constitutes a high voltage detecting and controlling means 100 together with the high voltage detecting circuit 15.

Reference numeral 18 represents a remote control standby transformer for supplying a voltage, which has been rectified by a rectifying circuit including a diode 19 and a capacitor 20 to a control circuit 21 and also to the signal receiver 22 and the high voltage detector 16. Reference numeral 13 represents an auxillary power switch provided in the television receiver set.

The circuit of the construction designed according to the present invention and shown in and described with reference to FIG. 1 operates in the following manner.

When and so long as the television receiver set is held in a standby condition, the relay switch 3a is opened while the main power switch 2 is closed. However, either when the auxiliary power switch 23 is closed or when the ON signal emitted from the transmitter of the remote control unit 24 is received by the signal receiver 22, the control circuit 21 causes the relay coil 3b to be electrically energized with the relay switch 3a consequently closed thereby to power on the television receiver set.

During the operation of the television receiver set so effected in the manner as hereinabove described, a voltage generated from the third winding 12 of the flyback transformer 10 is rectified by the rectifying diode 13 and the smoothing capacitor 14, and the rectified voltage emerging from the rectifying circuit including the rectifying diode 13 and the smoothing capacitor 14 is then compared with the reference voltage corresponding to the breakdown voltage of the Zener diode 16b in the high voltage detector 16. The rectified voltage is normally lower than the reference voltage, and therefore, no detector output is generated at the output terminal 16a of the detecting circuit 16.

However, in the event that the voltage generated from the secondary winding 10b of the flyback transformer 10 which is being supplied to the cathode ray tube 11 increases abruptly by some reason, the voltage generated from the third winding 12 of the flyback transformer 10 is correspondingly increased, accompanied by the increase of the rectified output voltage emerging from the rectifying circuit constituted by the diode 13 and the capacitor 14. Since this rectified voltage would be of a value higher than the reference voltage across the Zener diode 16b of the detecting circuit 16, the voltage appearing at the output terminal 16a increase and, therefore, the output transistor 15b of the high voltage detecting circuit 15 is switched on with the consequence that the base potential of the relay drive transistor 17 becomes equal to the ground potential. Therefore, the relay drive transistor 17 is switched off thereby to interrupt the flow of an electric current through the relay coil 3b, whereby the relay switch 3a which has been maintained in the closed position is opened. The opening of the relay switch 3a brings the television receiver set in the standby condition.

It is to be noted that, so long as the television receiver set is held in the standby condition as a result of the opening of the relay switch 3a, the high voltage detector 16 is powered, and remains powered, by the voltage supplied from the remote control standby transformer 18.

As hereinbefore fully described, when the voltage being applied to the cathode ray tube abruptly increases to a critical value which would result in the increased emission of X-rays from the cathode ray tube, the supply of the electric power to the flyback transformer and also to the horizontal output circuit can be reliably interrupted without the high voltage protecting circuit deenergized or switched off. Therefore, the hazard resulting from the X-ray emission can be substantially minimized and, in addition, the necessity of use of the expensive component parts having a high voltage breakdown characteristic can be minimized.

Thus, according to the present invention, arrangement has been made that the voltage across the third winding of the flyback transformer is at all time monitored, and, in the event of the abnormal increase of such voltage, the control terminal-equipped switching device inserted in a main power supply line between the electric power source and the flyback transformer is switched off with the consequence that no voltage is, while the television receiver set is held in the standby condition, applied to the horizontal output circuit and the related circuits. In particular, since the main power supply line is switched off when the horizontal output circuit is brought into an inoperative state, the energy consumption is minimized and, moreover, the circuit components may have a relatively low voltage breakdown characteristic and are hence inexpensive, making it possible to manufacture the television receiver set at a reduced cost, even though the switching regulator is used for the power stabilizing circuit.

Although the present invention has been described in connection with the preferred embodiment thereof with reference to the accompanying drawings, it is to be noted that numerous changes and modifications can readily be conceived by those skilled in the art within the framework of obviousness. For example, although the relay switch assembly has been referred to as the control terminal-equipped switching device, a semiconductor switching element may be substituted for the relay switch assembly.

Also, although the high voltage detector has been shown and described as comprised of the Zener diode and the output transistor, it may be comprised of any suitable comparator and a reference voltage generator, the comparator being operable to compare the output voltage across the third winding of the flyback transformer with the reference voltage that is applied thereto from the reference voltage generator and also to generate an output signal only when the output voltage across the third winding of the flyback transformer exceeds the reference voltage.

Accordingly, such changes and modifications are to be understood as included within the spirit and scope of the present invention as defined by the appended claims, unless they depart therefrom.

What is claimed is:

1. A high voltage protecting circuit in a cathode ray tube apparatus comprising:
    a main power switch connected to an electric power source;
    a flyback transformer having primary, secondary and tertiary windings;
    rectifying circuit means connected to the main power switch for rectifying a power source voltage originating from the power source and supplying a rectified voltage to the primary winding of the flyback transformer;
    switching means connected between the main power switch and the rectifying circuit and including means responsive to a control signal applied thereto for controlling the ON and OFF operating state of said switching means;
    high voltage detecting and controlling means for comparing an output voltage produced across the tertiary winding of the flyback transformer with a reference voltage and generating a control signal when the output voltage exceeds the reference voltage, said control signal switching the switching means to the OFF state;
    a standby transformer connected to the electric power source through the main power switch, said standby transformer having primary and secondary windings; and
    additional rectifying circuit means, and wherein the secondary winding of the standby transformer generates a voltage thereacross which is supplied through the additional rectifying circuit means to the high voltage detecting and controlling means for keeping the high voltage detecting and controlling means in an operative condition regardless of the operating state of the switching means.

2. The high voltage protecting circuit as claimed in claim 1, wherein the high voltage detecting and controlling means further comprises:
    a high voltage detecting circuit for generating a detection signal when the output voltage across the tertiary winding of the flyback transformer exceeds said reference voltage; and
    a drive transistor operable in response to the detection signal to generate said control signal for switching and maintaining the switching means in the OFF state.

3. The high voltage protecting circuit as claimed in claim 2, wherein the high voltage detecting circuit further comprises:
    a high voltage detector for generating an output signal when the output voltage across the tertiary winding of the flyback transformer exceeds the reference voltage; and
    an output transistor operable in response to said output signal from the high voltage detector to generate said detection signal.

4. The high voltage protecting circuit as claimed in claim 3, wherein the high voltage detector further comprises:

a Zener diode having a breakdown voltage corresponding to the reference voltage; and a high voltage output terminal coupled to the Zener diode from which a high voltage emerges when the output voltage across the third winding of the flyback transformer exceeds the breakdown voltage of the Zener diode.

5. A high voltage protecting circuit in a cathode ray tube apparatus comprising:

a main power switch connected to an electric power source;

a flyback transformer having primary, secondary and tertiary windings;

rectifying circuits means connected to the main power switch for rectifying a power source voltage originating from the power source and supplying a rectified voltage to the primary winding of the flyback transformer:

switching means connected between the main power switch and the rectifying circuit and including means responsive to a control signal applied thereto for controlling the ON and OFF operating state of said switching means;

a high voltage detecting and controlling means for comparing an output voltage produced across the tertiary winding of the flyback transformer with a reference voltage and generating a control signal when the output voltage exceeds the reference voltage, said control signal, switching the switching means to the OFF state; and remote-controlled circuit means coupled to a control terminal of the switching means and being operable in response to an external signal emitted from a remote controller to control the switching means.

6. The high voltage protecting circuit as claimed in claim 5, and further comprising:

a standby transformer connected in series with the electric power source through the main power switch, said standby transformer having primary and secondary windings;

an additional rectifying circuit; and wherein the secondary winding of the standby transformer generates a voltage thereacross which is supplied through the additional rectifying circuit to a terminal of the remote-controlled circuit means.

7. The high voltage protecting circuit as claimed in claim 5, wherein said switching means comprises an electrical relay.

8. The high voltage protecting circuit as claimed in claim 7, wherein said relay includes a pair of switch contacts connectable in series between the main power switch and the rectifying circuit means and wherein said controlling means operates a relay coil for operating said switch contacts.

* * * * *